(12) United States Patent
Underwood et al.

(10) Patent No.: US 12,393,994 B2
(45) Date of Patent: Aug. 19, 2025

(54) SYSTEM AND METHODS FOR GATHERING DATA RELATING TO CROPS AND FOR MANAGING CROP GROWING OPERATIONS

(71) Applicant: SEEING SYSTEMS PTY LTD, Hornsby (AU)

(72) Inventors: James Patrick Underwood, Hornsby (AU); Stephen John Scheding, Hornsby (AU)

(73) Assignee: SEEING SYSTEMS PTY LTD, Hornsby (AU)

( * ) Notice: Subject to any disclaimer, the term of this patent is extended or adjusted under 35 U.S.C. 154(b) by 334 days.

(21) Appl. No.: 17/761,773

(22) PCT Filed: Sep. 20, 2019

(86) PCT No.: PCT/AU2019/051007
§ 371 (c)(1),
(2) Date: Mar. 18, 2022

(87) PCT Pub. No.: WO2021/051150
PCT Pub. Date: Mar. 25, 2021

(65) Prior Publication Data
US 2022/0330468 A1    Oct. 20, 2022

(51) Int. Cl.
*G06Q 50/02* (2024.01)
*A01B 79/00* (2006.01)
(Continued)

(52) U.S. Cl.
CPC ........... *G06Q 50/02* (2013.01); *A01B 79/005* (2013.01); *A01B 79/02* (2013.01); *G01N 21/17* (2013.01);
(Continued)

(58) Field of Classification Search
CPC ...... A01B 79/005; A01B 79/02; G06Q 50/02; G06V 10/141
See application file for complete search history.

(56) References Cited

U.S. PATENT DOCUMENTS

2003/0174865 A1    9/2003   Vernon
2015/0124054 A1*   5/2015   Darr .................... G01F 25/0084
                                                        348/46
(Continued)

FOREIGN PATENT DOCUMENTS

CN    107426958 A  * 12/2017    .......... A01B 79/005
EP    3 425 572 A1    1/2019

OTHER PUBLICATIONS

Stein, M., Bargoti, S., & Underwood, J. (2016). Image Based Mango Fruit Detection, Localisation and Yield Estimation Using Multiple View Geometry. Sensors (Basel, Switzerland), 16(11); herein after "Stein"). (Year: 2016).*

(Continued)

*Primary Examiner* — Lisa M Caputo
*Assistant Examiner* — Nyla Gavia
(74) *Attorney, Agent, or Firm* — Finch & Maloney PLLC

(57) ABSTRACT

A scanning device for use in gathering data relating to crops is described including: at least one camera; and a stroboscopic light source is associated with each at least one camera; the device is arranged to be moved around an area where a crop is grown and includes a means for determining the location of the device in the area; the device being arranged to take images of the crop from the at least one camera in synchrony with the stroboscopic light source as the device moves around the area; and wherein the stroboscopic light source has a light output of greater than $6 \times 10^{-5}$ joules/cm$^2$ (at 2 feet).

13 Claims, 5 Drawing Sheets

(51) Int. Cl.
*A01B 79/02* (2006.01)
*G01N 21/17* (2006.01)
*G01N 21/84* (2006.01)
*G01S 17/89* (2020.01)
*G06T 7/00* (2017.01)
*G06V 10/141* (2022.01)
*G06V 20/10* (2022.01)
*G06V 20/56* (2022.01)

(52) U.S. Cl.
CPC .............. *G01N 21/84* (2013.01); *G01S 17/89* (2013.01); *G06T 7/0012* (2013.01); *G06V 10/141* (2022.01); *G06V 20/10* (2022.01); *G06V 20/188* (2022.01); *G06V 20/56* (2022.01); *G01N 2021/1791* (2013.01); *G01N 2021/1797* (2013.01); *G01N 2021/8466* (2013.01); *G06T 2207/30188* (2013.01)

(56) References Cited

U.S. PATENT DOCUMENTS

2017/0016870 A1* 1/2017 McPeek ................. G01S 17/86
2017/0359943 A1* 12/2017 Calleija ................ A01B 79/005
2020/0019777 A1* 1/2020 Gurzoni, Jr. ......... G06V 10/803

OTHER PUBLICATIONS

Jay P. Morgan, "Continuous Lighting vs. Strobes: The Pros and Cons of Each", Published Oct. 5, 2018, See International Search.
Wikipedia, "Strobe Light", published Dec. 31, 2005 as per Wayback Machine, See IPRP.
International Search Report Corresponding to PCT/AU2019/051007 mailed Oct. 31, 2019.
Written Opinion Corresponding to PCT/AU2019/051007 mailed Oct. 31, 2019.
International Preliminary Report on Patentability Corresponding to PCT/AU2019/051007 mailed Jan. 7, 2022.
Stein et al., "Image Based Mango Fruit Detection, Localisation and Yield Estimation Using Multiple View Geometry", Sensors, vol. 16, Jan. 1, 2016.
European Search Report Corresponding to 19945437.2 mailed Apr. 12, 2023.

* cited by examiner

SYSTEM AND METHODS FOR GATHERING DATA RELATING TO CROPS AND FOR MANAGING CROP GROWING OPERATIONS

TECHNICAL FIELD

The present invention relates to systems and methods for managing crops and particularly relates to imaging based systems for analysing tree-crops to provide information which informs decisions regarding the management of those crops.

BACKGROUND TO THE INVENTION

The growing of crops is an age-old human activity. When growing crops, decisions must be made as to the timing and nature of a wide range of crop growing activities from pruning or thinning to harvesting the crop. The decisions involved in managing growth of crops are numerous and include:

When, where and how to prune
When, where and how to thin flowers and fruitlets
When to harvest and how much labour to engage for the harvest.

Underlying these decisions is a desire to achieve a balance between expending resources on the crop such as labour, land area, and fertilizers to produce crops of high quality and with a high yield.

Crop growers look to various sources to inform their decisions regarding the management of their crops which include historical meteorological information, forecasted meteorological information, soil condition and information gathered from making visual inspections of the crop plants.

When inspecting crops which are grown over a very large area of land it is typically only feasible to inspect samples of the crop, rather than the entire crop. These inspections may be made at the edges of the crop or at selected locations within the area of the crop. Such sampling techniques are often based on the assumption that the crop is uniform over its area, which is usually not the case. As such, decisions taken based on the samples may not be optimal for the entire crop area.

It has been tried to inspect crops from an aircraft or other airborne vehicle flying over the crop and taking photographic images. However, this approach can only assess the very top facing part of the crop plants. With many types of crops, such as tree type crops, an aerial view can provide only very limited information as much of the crop volume is hidden from view by the tree canopy.

There remains a desire for new or improved methods to inform crop growing decisions to further enhance and optimise crop growing operations.

SUMMARY OF THE INVENTION

In a first aspect the present invention provides scanning device for use in gathering data relating to crops including: at least one camera; and a stroboscopic light source is associated with each at least one camera; the device is arranged to be moved around an area where a crop is grown and includes a means for determining the location of the device in the area; the device being arranged to take images of the crop from the at least one camera in synchrony with the stroboscopic light source as the device moves around the area; and wherein the stroboscopic light source has a light output of greater than $6\times10^{-5}$ joules/cm$^2$ (at 2 feet).

The stroboscopic light source may have a light output of greater than $1\times10^{-4}$ joules/cm$^2$ (at 2 feet).

The stroboscopic light source may have a light output of about $1.2\times10^{-4}$ joules/cm2 (at 2 feet).

The at least one camera may be configured with an exposure time of less than 150 μsec.

The at least one camera may be configured with an exposure time of less than 100 μsec.

The at least one camera may be configured with an exposure time of about 30 μsec.

The at least one camera may have a field of view greater than 90 degrees.

The at least one camera may have a field of view of about 130 degrees.

The locating means may include a GPS receiver.

The scanning device may further include at least one LiDAR detector for gathering data relating to the crop.

The LiDAR detector may also form part of the locating means.

The scanning device may be mounted to a wheeled vehicle.

In a second aspect the invention provides a system for determining attributes of a crop including: a scanning device for gathering data according to the first aspect of the invention; and a data processing device; the data processing device is arranged to process the data to determine attributes of the crop.

The attributes may include the location and/or the density of features of the crop.

The attributes may include an assessment of the features of the crop per metre.

The attributes may be separated into different height bands of the crop.

The features may include any of flowers, fruitlets, buds, shoots, fruits, nuts, pests or visually identifiable diseases.

The attributes of the crop include items of infrastructure deployed in the crop.

The items of infrastructure may include water lines, non-operational sprinklers or operational sprinklers.

The attributes of the crop may be at least partially determined by analysing the output of the at least one camera.

The attributes of the crop may be at least partially determined by analysing the output of the at least one LiDAR detector.

The attributes of the crop may be based on a combination of the output of the GPS receiver and the at least one LiDAR detector.

The system may produce a visual output indicating the locations of the attributes of the crop.

The visual output may include a spatial variability map.

In a third aspect the invention provides a method of managing crop growing operations including the steps of: determining attributes of the crop by use of a system according to the second aspect of the invention; and controlling crop growing operations based on the determined attributes.

The step of controlling crop growing operations may include the step of controlling crop machinery.

In a fourth aspect the invention provides a method of gathering data relating to as crop including the steps of: providing a scanning device according to the first aspect of the invention; and moving the scanning device in relation to the crop at a speed greater than 20 km/h.

The scanning device may be moved in relation to the crop at a speed greater than 40 km/h.

BRIEF DESCRIPTION OF THE DRAWINGS

Embodiments of the present invention will now be described, by way of example only, with reference to the accompanying drawings, in which.

DETAILED DESCRIPTION OF THE PREFERRED EMBODIMENT

A system according to this embodiment of the invention consists of two primary components; the scanner and the processor. The embodiment which will now be described has been optimised for use in determining attributes of a crop of apple trees grown in rows in an orchard. The attribute being determined in this example is the yield of the crop and this is determined by detecting instances of apples on the trees.

The Scanner

Figure 1:
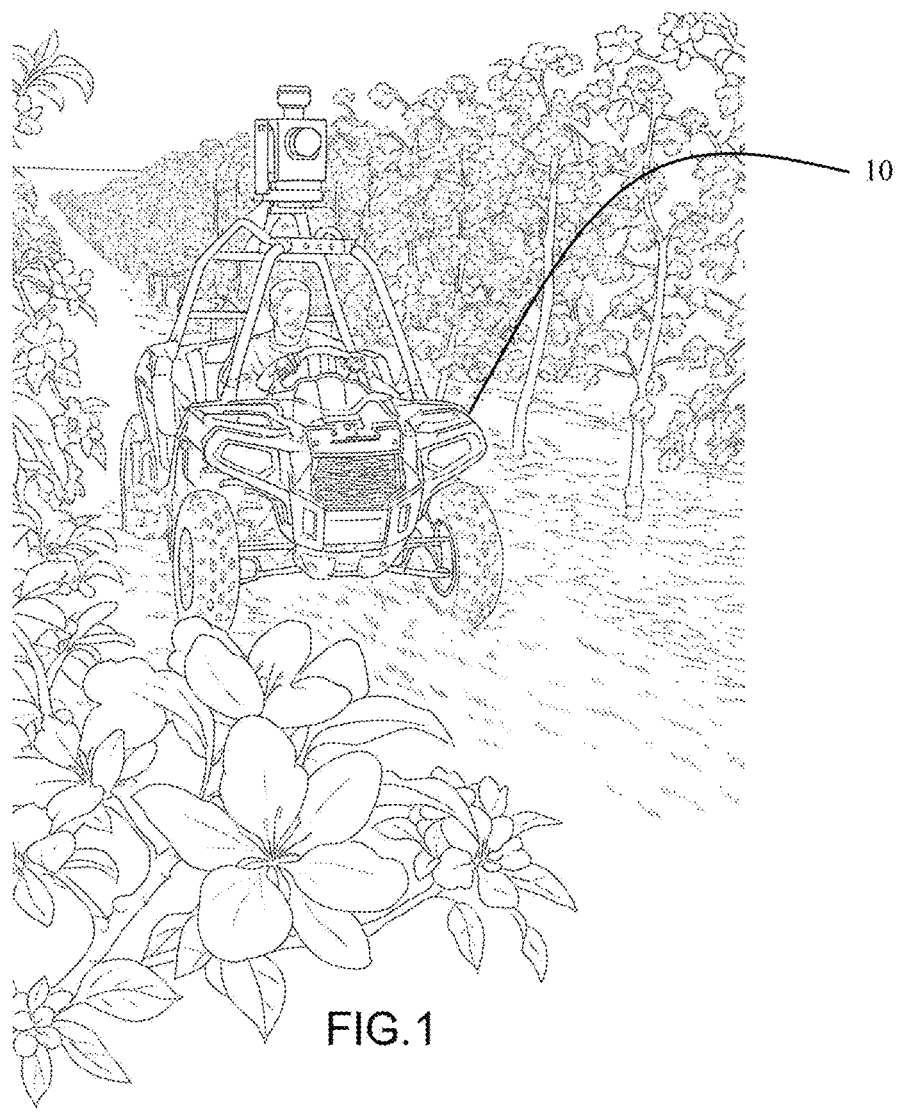
FIG. 1 shows a scanner arrangement mounted to a vehicle being driven in an apple orchard.

Referring to FIG. 1, a scanner 10 is shown. It is principally a data gathering platform and is mounted to an appropriate vehicle for transporting the scanner around the area in which the crop is grown, which in FIG. 1 is along rows of trees in an apple orchard. In this example, scanner 10 is shown mounted to a Polaris™ ATV. The scanner is comprised of various electronic components which are arranged on a frame which is mounted to the roll cage of the ATV.

Figure 2:
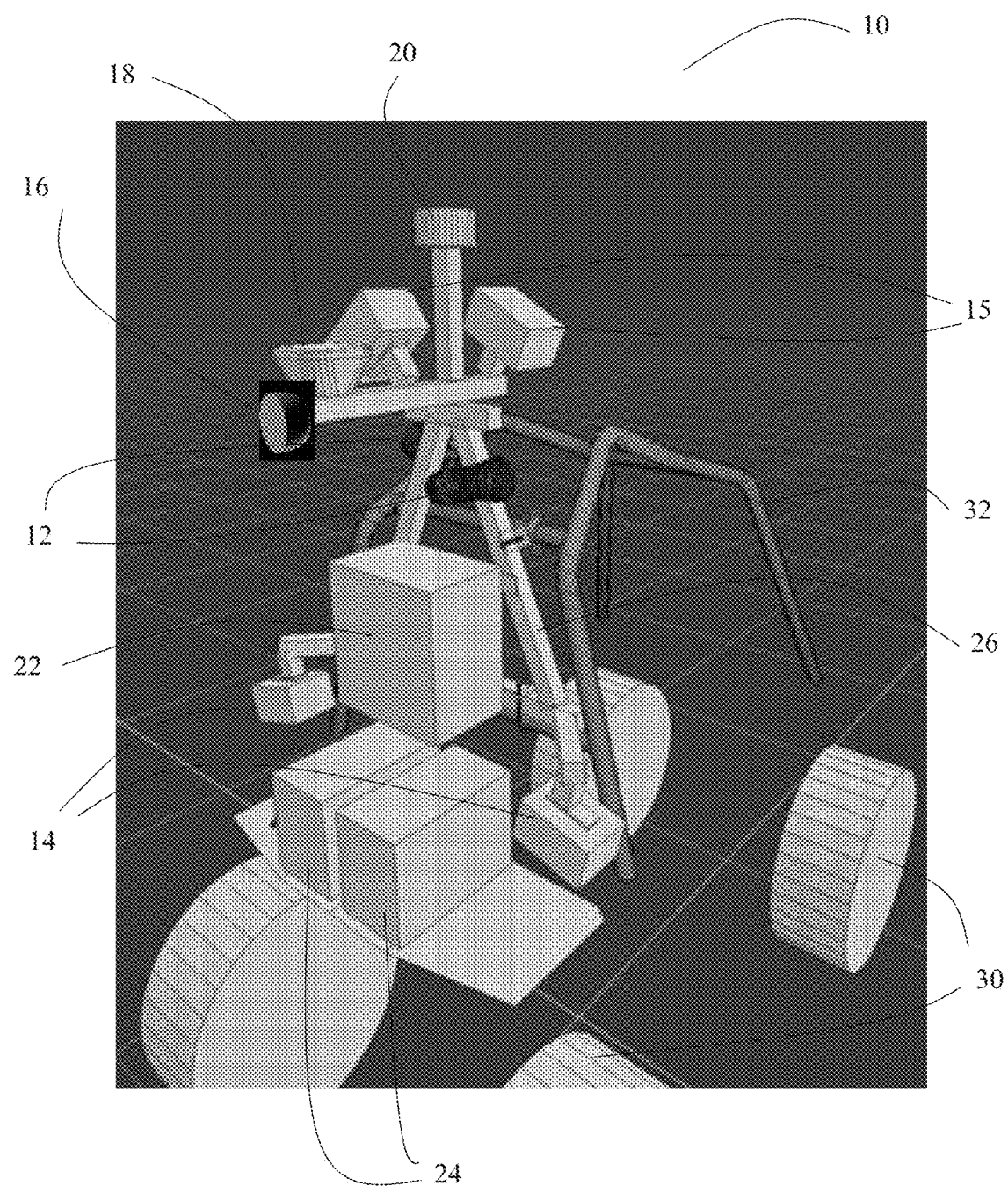
FIGS. 2 and 3 are schematic views of the scanner of FIG. 1.
Figure 3:
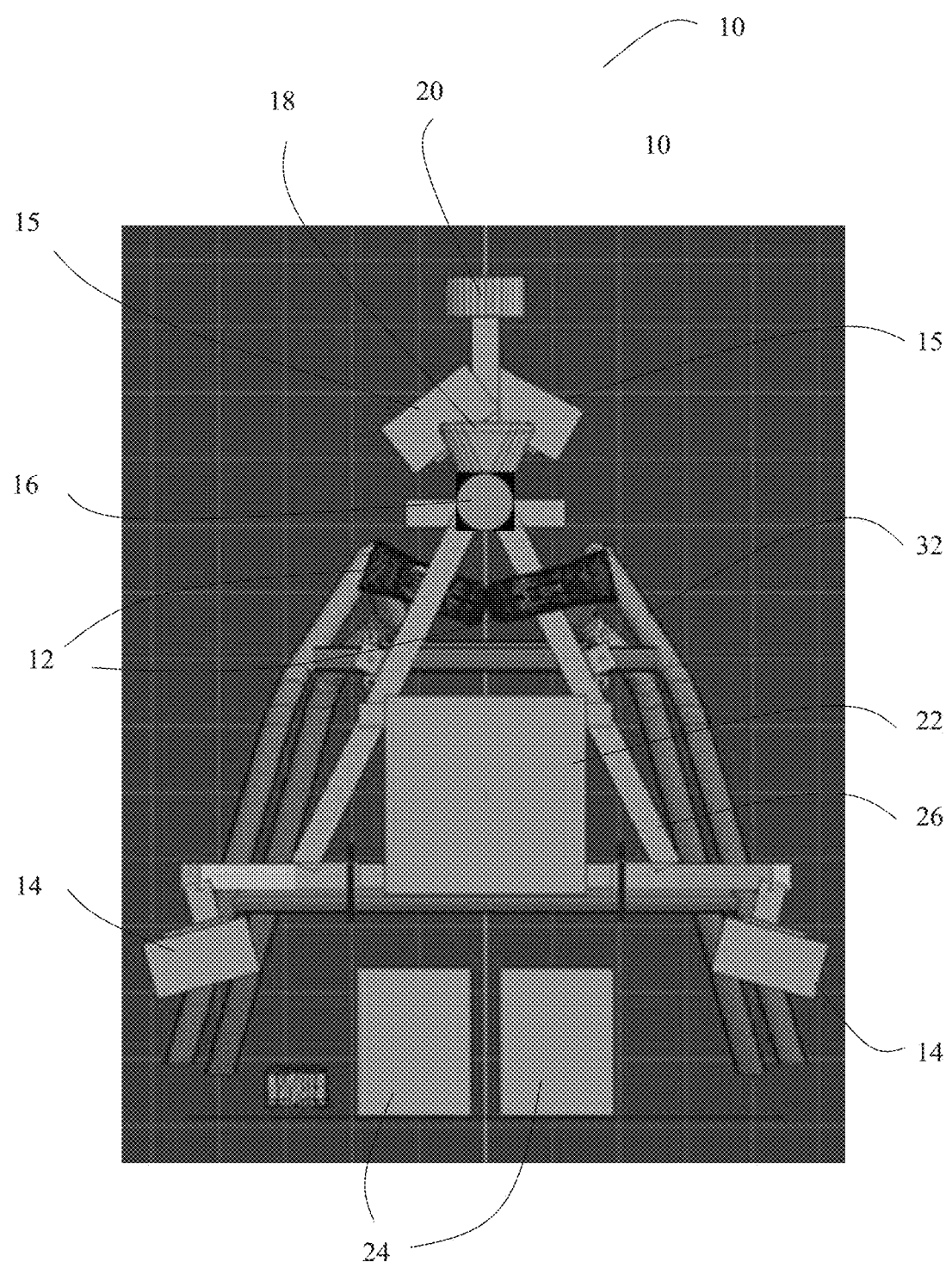

Referring to FIGS. 2 and 3, the components of the scanner are shown schematically with most of the parts of the ATV omitted for ease of understanding. The scanner 10 includes two cameras 12 with each camera pointing outwardly on either side of the scanner to enable simultaneous scanning of the rows of trees on either side of the scanner. Two stroboscopic light sources are provided, each pointing outwardly in opposite directions, one to the left and one to the right. Each stroboscopic light source is made up of two strobe light units, being one of upper strobe lights 15 and one of the lower strobe lights 14 which point in the same direction. Each pair of strobe lights 14, 15 are synchronised to operate in unison.

Cameras 12 are made up of a combination of a camera body and lens. Good results have been obtained using 3MP or 9MP cameras. Suitable cameras are commercially available from suppliers such as Allied Vision Technologies GmbH or Sony Corporation. Suitable lenses may be obtained from suppliers such as Myutron, Inc.

The strobe light units 14, 15 are selected to provide an extremely high level of brightness. Each strobe light unit 14, 15 has a light output of $6 \times 10^{-5}$ joules/cm$^2$ (measured at 2 feet). So, the combined light output of each stroboscopic light source is twice this amount i.e. $1.2 \times 10^{-4}$ joules/cm$^2$ (at 2 feet). Suitable strobe light units are available from Phoxene (Dardilly, France).

The System is arranged to synchronise the taking of images from the cameras with the flashes produced by the stroboscopic light sources. The stroboscopic light sources have a flash duration of approximately 50 μs to 100 μs. The cameras are set to expose for about 100 μs and are synchronised with the strobes to be timed so that the entirety of the strobe flash occurs whilst the camera is exposing.

Scanner 10 further includes two LiDAR sensors, one mounted horizontally 20, the other vertically 16. These allow tree geometry to be digitised either to assist localisation (if GPS is poor), to analyse tree structure for grower decision support, and to combine with camera imagery to allow camera data to be made metric (i.e. convert fruit counts from counts-per-image to counts-per-meter, or counts-per-tree).

A multi-constellation GPS receiver 18 (GPS, GLONASS, Galileo etc) provides the primary source of localisation data for the scanner. The GPS receiver may also incorporate an electronic compass, or may deduce its heading and orientation from differencing GPS measurements as is known in the art.

A data logging computer which logs to a removable Solid-State Storage device (SSD) is provided inside rugged housing 22. Batteries and integrated charger 24 provide power to the system. The scanner also includes a communications module to provide an internet connection on the scanner to allow remote maintenance and over the wire updates.

All of these components are mounted to a support frame 26 which is in turn attached to the roll cage 32 of the ATV (the wheels 30 of the ATV are also visible in FIG. 2). The outputs of the cameras 12, GPS 18 and LiDARs 16, 20 are logged to the data logging computer. The logged data is time-stamped to high accuracy (using GPS time as a reference) to ensure that all data sources can be accurately cross-referenced.

Figure 4:
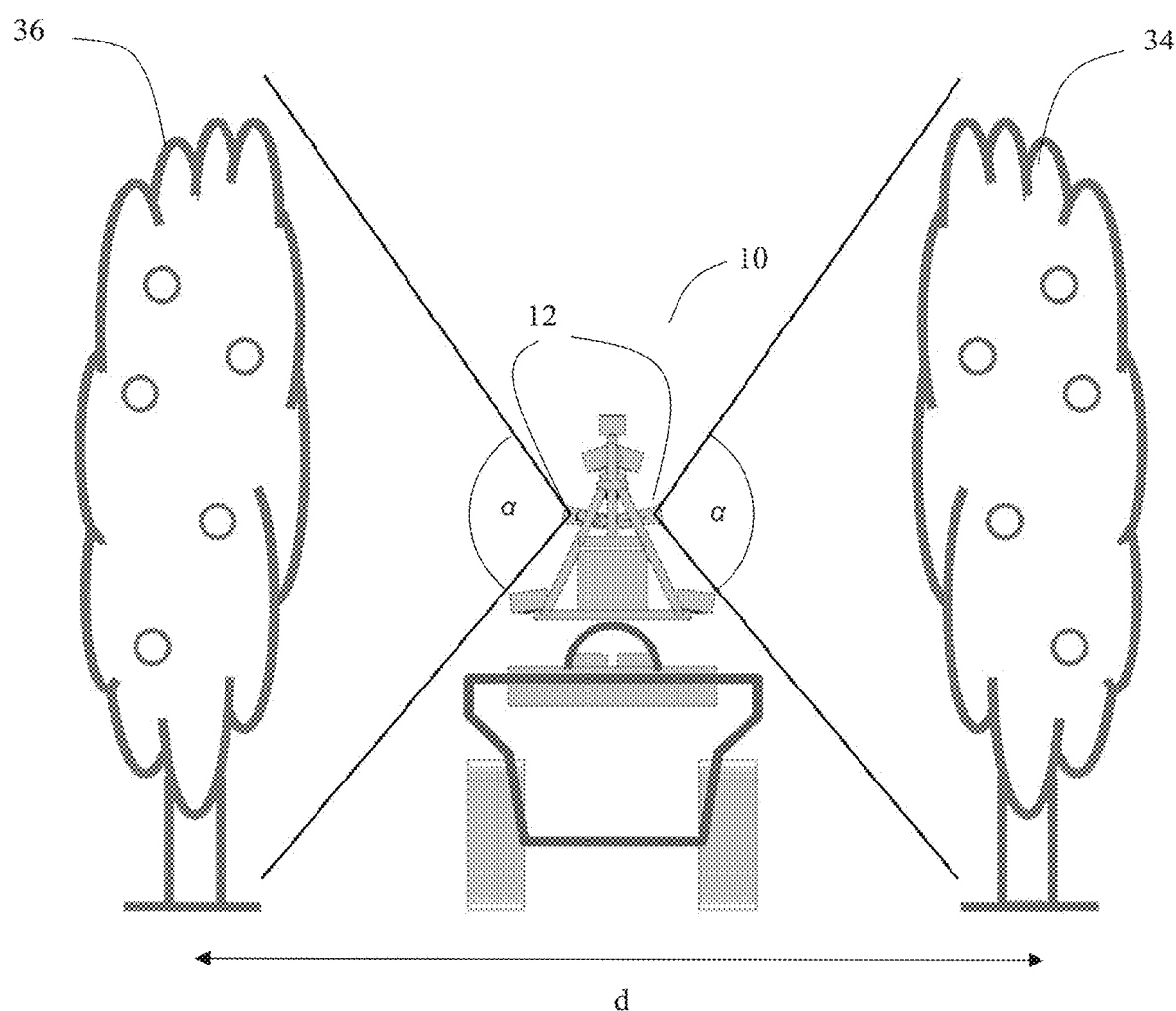
FIG. 4 is a frontal schematic view of the scanner of FIG. 1 shown scanning apple trees in an orchard.

Referring to FIG. 4, scanner 10 is shown from the front in the process of scanning apple trees in an apple orchard. The typical spacing of apple trees (d) is 3.6 m to 4 m. Scanner is driven along the centroid line between the trees (i.e. approximately 2 m away from trees on either side). By providing cameras fitted with extremely wide angle lenses where α=130 degrees it has been found that the entire height of an apple tree of typical height of 4 m can be scanned by a single camera whilst the scanner is located at about the centroid. This enables scanning of the entire apple tree on both sides of the scanner using two cameras, with one pointing in each direction left and right.

The Processor

The processor is essentially an off-the-shelf computer with significant compute power (both CPU and GPU). Due to the quantity of data gathered by the scanner (up to 4 Tb per day), the processor is operated as an 'Edge' computer i.e. it is to be physically located near to where the scanning takes place. It would be currently infeasible (both cost and time) to send the data 'to the cloud', have it processed and be available to a grower within the time constraints needed by growers which could be in the afternoon for a morning scan, or the next morning.

The processor takes the removable SSD from the scanner as its input. Once inserted into the processor, the computer automatically backs up all scanner data, and automatically processes the raw data into a form useful for grower use-cases.

Key software modules/algorithms deployed on the processor include:
  Simultaneous Localisation and Mapping (SLAM) allowing LiDAR as an alternate or complimentary localisation source to GPS
  Training: the training algorithm is provided with sample images which have been previously analysed by human operators and labelled sub-images accordingly to identify features of interest in the images (i.e. images will be labelled with examples of fruits, flowers, fruitlets, or other formations which are of interest, depending upon the particular type of crop that is being analysed). Standard machine learning training methods are used to build model for use in the Inferencing stage. This model only needs to be built once per crop type and may then be used indefinitely, or alternatively it can be constantly updated to improve the overall performance of Inferencing.

Inferencing: for each image, the algorithm identifies objects that match the model built during the Training phase. The outputs of this algorithm are the counts-per-image of the desired feature (flowers, fruit) and their locations within the images. Suitable inferencing algorithms are known in the art and open source algorithms are available.

Geometry: the processor will additionally process LiDAR data to determine key tree metrics such as canopy volume and density, tree height, light interception and opportunities for pruning etc.

Georeferencing: the processor combines the localisation data (from GPS or SLAM or both) with the detections from the inferencing step, to produce the underlying data in map form. It uses geometry to project from where the images were taken out to where the actual tree is. This can be done either by assuming the tree is half the row width in front of the camera, or more accurately by using LiDAR scene interpretation to measure how far away the trees actually were. Additionally—the data is optionally divided into N different height bands from low to high within the canopy. This provides maps of the lower, middle and upper (e.g. if N=3) canopy bands separately. Where LiDAR information is combined with camera images the system utilises highly accurate (sub millisecond) time synchronisation between sensors (including between GPS, cameras and LiDAR) to achieve the most accurate relationships between the different data streams.

Build data product: This algorithm automatically gathers the results from all the data processing algorithms and converts them into a form suitable for delivery to growers. The data product is a website that can be served from the processor, from the cloud, or copied to a removable storage device for direct delivery to a grower. The data product is also provided in a simple file format (e.g. CSV or other) that can be ingested by arbitrary third party data management software (e.g. GIS applications or otherwise).

The processor also includes a communications module to provide an internet connection to allow remote maintenance and over the wire updates.

System Use

The general procedure for use of the system is as follows. The separation of the scan function from the processing function gives a significant amount of flexibility in system operation (and also ease of use):

Arrive on site—assemble scanner onto vehicle (if not already done)

Power up scanner

Start Scanner (two options):

Use toggle switch to start/stop scanning (strobes flashing indicates the scanning state)

Drive scanner 10 along rows of crops. A web interface from an external phone/tablet/PC is used is optionally used as scanning progresses to enter meta-data (block number, row numbers, farm, operator etc), to monitor system status and to start/stop scanning.

When daily scan operations are complete: power down the scanner, plug in to mains power to recharge and then remove the scanner SSD.

Insert SSD into the processor.

After processing has completed, view resulting data. Copy to location preferred by grower (local hard drive, the cloud, USB key etc).

Figure 5:
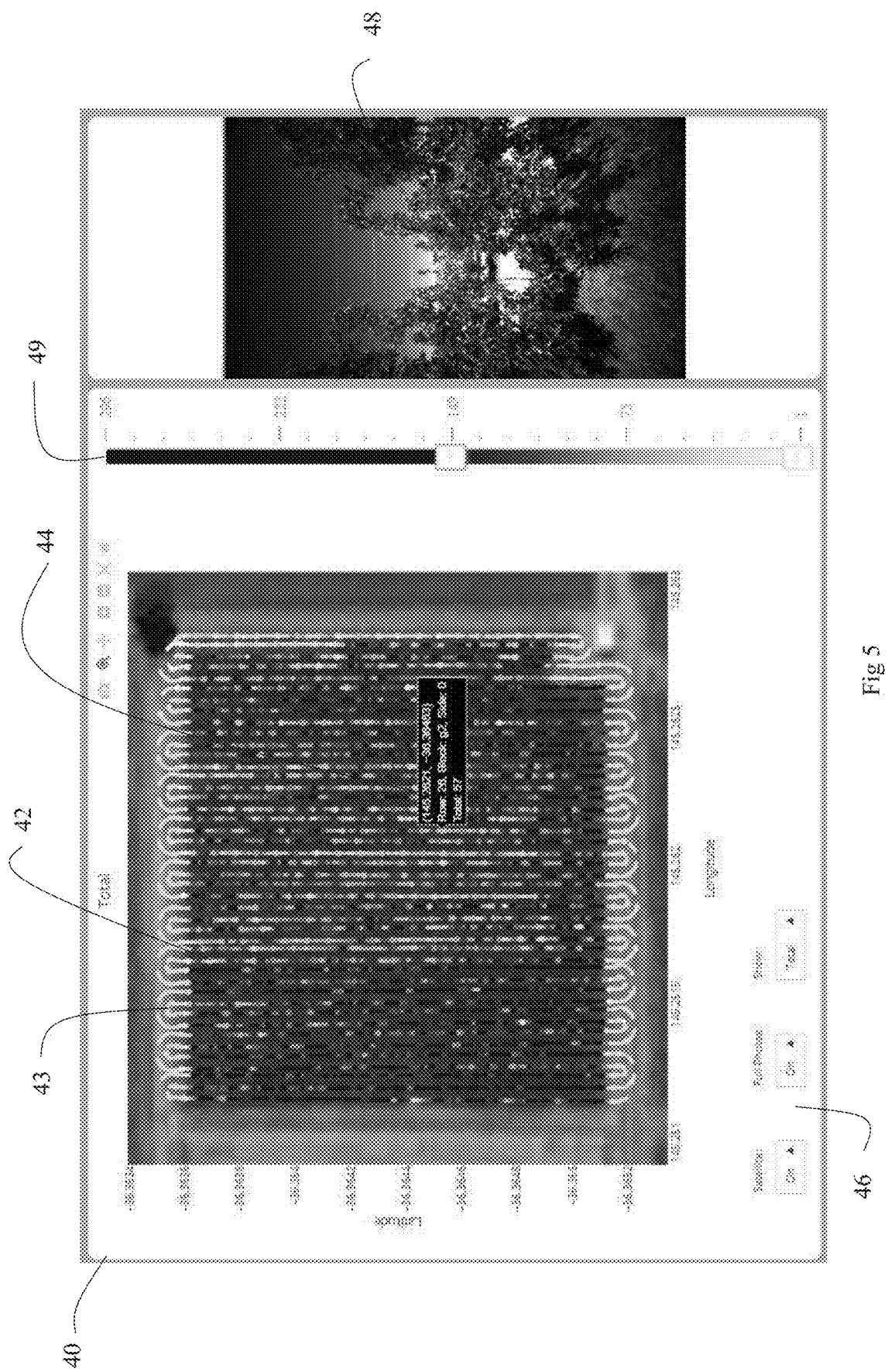
FIG. 5 is an example of a screenshot of a user interface showing data output by an embodiment of the system.

Referring to FIG. 5, a screenshot from the user interface 40 served by the processor is shown displaying the results of data scanned in an apple orchard to estimate the yield of apples on the trees. The Training algorithm was taught from various sub-images which were manually labelled as representative of "an apple". The Inferencing algorithm then analysed the images taken of the trees around the orchard to determine the number of instances of "apples" in each image.

The rows of apple trees are indicated in a spatial variability map in the form of heatmap 42 in shades of colour, with a light colour representing low density of apples, and a dark colour representing high density of apples. This enables an assessment to be made of the yield of apples in the orchard. It can be seen from the image that there is a generally lighter colour depicted for the central part of the image, indicating a lower yield of apples in the centre region of the orchard.

The user can use their mouse or cursor to hover on a particular spot 44 in heatmap 42 and a text label is shown identifying this location as Row: 20, Block: g2, Side: 0. The text box indicates that 57 apples were counted at this location. At the right hand side of the interface the actual image is shown in which the Inferencing algorithm counted 57 apples. The user can click on the image to inspect the full resolution photograph in detail.

User can control aspects of the display using controls 46. Slider 49 allows for adjustment of the colour scale of the heatmap image. It informs the user as to what feature count corresponds to which colour. It allows a user to 'threshold' the heatmap (e.g. they may only want to know about counts above 100, or counts below 10, and the slider pips allow them to highlight those areas in a single block colour. It also assists to provide visual saliency—adjusting the slider changes the effective resolution of the colour scale—this may help to make subtle variations in the heatmap more obvious visually (this is an issue when a few outliers (i.e. very high or very low counts) make the colour scale much more spread-out than it otherwise would be).

So called, "headland" areas of the heatmap 43 are areas beyond the rows where no fruit trees are grown. The ATV with scanner 10 mounted to it performs turns in these regions at the end of each pass along a row.

The use of a very powerful illumination/lighting system (e.g. short pulse high energy strobes) with a combined light output of greater than $6 \times 10^{-5}$ joules/cm$^2$ (at 2 feet) has been found to overpower the illumination provided by sunlight to allow for consistent scanning of a crop at any time of day or night as well as operation in sunny or cloudy conditions with repeatable results.

The use of high-powered illumination has also given rise to additional unexpected effects. It has allowed use of very short camera exposure times of approximately 100 us or shorter. The use of very short camera exposure times synchronised to the lighting source gives rise to clear sharp images despite the bumps and vibrations which are encountered as a result of driving the scanner over uneven terrain.

The combined effect of high powered illumination and short exposure times has also given rise to a drastic and unexpected increase in the speed at which the scanner can travel whilst still capturing clear sharp images. Early stage testing was carried out at a speed of approximately 6 km/h. The speed of travel of the scanner was progressively increased in 5 km/h increments. Clear sharp images were surprisingly still being captured when the scanner was travelling at 50 km/h. Other limitations have generally prevented the scanner being tested at faster speeds, such as the ability of the scanner vehicle to negotiate uneven terrain at speed, with consequential safety concerns for the driver/pilot of the scanner.

The use of wide-angle camera systems (e.g. very wide-angle lens or a multiple camera array) allows the whole height of trees to be seen from the inter-row space including from near the inter-row centreline, with cameras facing both left and right meaning twice the scan rate compared to one side only, by seeing two tree faces for each inter-row traversal.

The scanner allows for fast scan coverage rates with excellent data quality of an orchard with speeds driving along orchard inter-rows of up to 50 km/hr or 36 ha/hr). For some types of crop i.e. those with few leaves, it may be possible to obtain a reliable count of features (fruits, nuts etc.) by scanning just one side of the tree. In these cases, scan rates can be doubled as only each second row of the crop needs to be traversed. In some cases a subset of the crop can be scanned. This provides for a less accurate result but allows for faster scanning times.

The system uses imaging for crop estimation such as flower fruitlet fruit detection and mapping; and also LiDAR for canopy geometry modelling and mapping such as tree heights, canopy sizes and volumes, and sunlight penetration/canopy density/light interception performance. There is also a beneficial combination of LiDAR and camera processing whereby the LiDAR is used to measure the metric extents of the camera scene (e.g. metric distances between things seen in the images), to allow for example conversion of detected flowers/fruitlets/fruit per image to detections per metre of crop row or detections per tree, in turn to assist for calibration for yield estimation.

Additionally, using LiDAR based Simultaneous Localisation and Mapping (SLAM) improves orchard map accuracy and repeatability regardless of GPS outages or quality of service (and including with no GPS at all, or combined with GPS to give the benefit of LiDAR precision and GPS global accuracy). The use of this sensor combination allows for mapping accurately on a single occasion, including for example precise lining up of rows and matching of opposing tree sides (which can be challenging with GPS based systems). The use of this sensor combination provides excellent repeatability for purposes of matching maps at different times, e.g. to compare two maps of the same block at different times, such as before and after an operation to measure the performance of that operation, or flowers vs fruit, or flowers one year with flowers next year, etc.

The use of repeatable, accurate localisation facilitates alignment of subsequent actions precisely to the data used to determine that action, e.g. to spatially moderate an action such as spray or spreading according to a previously obtained map, leveraging the ability to precisely locate the sprayer/spreader within that previous map. In simple terms, deciding to spray tree 73 a certain way requires that you know exactly when the sprayer is in front of tree 73, and not 72 or 74.

In some embodiments the processor may additionally apply an algorithm known as 'row segmentation'. This processes the trajectory (from GPS or Simultaneous Localisation and Mapping (SLAM) or both) to separate headland areas from rows and to segment the individual rows that were scanned. It does this by combining constraints about how orchards are typically laid out with constraints about how vehicles can physically drive through orchards (e.g. rows are approximately parallel to each other and you can't jump from one row to another in a vehicle). It's useful for situations where it is important to know which row was which explicitly. This algorithm also speeds up the inference processing, by not processing images from the headland where there are no flowers/fruit/trees etc.

In some embodiments, and if GPS conditions are good, the SLAM algorithm can be omitted.

It can be seen that embodiments of the invention allow for flower, fruit and nut counts to be quickly and accurately mapped over entire orchards. With high resolution AI assisted mapping, the density map showing the distribution of flowers or fruit in an orchard allows high-level management decisions to be made. Ultimately the density maps would also be fed to autonomous systems (such a robotic sprayers or picking machines) to enable tree-level specificity.

There is no reason the system couldn't be mounted to a flying system (i.e. a drone), however commercially operated drones currently don't have the required payload capacity, flying time, or robust obstacle avoidance required for most orchard use-cases where the cameras need to be operated below the tree canopy tops to gather the most useful data.

Although the embodiment described above was described in relation to counting apples in an orchard the invention could be applied to a wide variety of crops. For each crop of application, the camera geometry (i.e. field of view) may need to be adapted to capture a view of the features of interest on the plants, and the training algorithm needs to be taught what features are to be counted. Other types of features which can be detected and counted include any of flowers, fruitlets, buds, shoots, nuts, pests or visually identifiable diseases.

In other embodiments the features of the crop can include detection of infrastructure and/or infrastructure issues. For example, the system can be configured to detect whether water lines are buried vs exposed, and where the sprinklers attached to those water lines (called emitters) are working or not. In such an embodiment the training algorithm would be "taught" with manually labelled images showing examples of the infrastructure such as water lines, and images of functioning and non-functioning sprinklers.

It can be seen that embodiments of the system have at least one of the following advantages:

Allows automation of the care of every fruit on every tree. Assists growers in managing their tree-crops by providing them with tree-level data of the 'performance' of their trees (flower/fruit counts, yield estimation, canopy volume, pruning decision support etc)—the system should have enough sensing capability to provide near-term solutions, as well as future features through additional software development.

Vehicle and commodity agnostic. Allow the system to be used across a variety of agricultural commodities and attach to any vehicle (manual or automated) with minimum development effort—saving development costs.

Power efficiency. The system should be capable of being able to operate for long periods of time (greater than a standard 'shift') without requiring refuelling or recharging. Maximises the amount of time the system can operate in the field without intervention—reduces costs and user frustration.

High speed. Maximising the speed of data acquisition minimises the variable cost component of service delivery, improving margins.

Fast data delivery. Maximising the speed of data acquisition minimises the variable cost component of service delivery. Fast delivery is particularly important for cases where the crop is changing rapidly, such as during flowering, where the decision/action to be informed by the data must occur soon (e.g. the day after the scan). Fast delivery also helps the logistics where the system is being taken from farm to farm, so that data can be delivered, and the scanning and or/processing platform can be moved on to the next farm efficiently, improving margins.

Data quality. When dealing with image data in particular, the image quality is often highly variable given that the ambient illumination is constantly changing and impossible to accurately predict. For accuracy and repeatability in image processing it is therefore desirable to provide an independent illumination solution that is capable of competing with sunlight, so that the resulting images are captured with very little lighting variability.

24 hour operation. The ability to operate any time of day or night maximises the potential number of use-cases the system can be used to solve, and additionally allows the system to more easily interleave with other on-farm operations (i.e. scanning might take place at night in preparation for spraying the following day).

Ease of use. The system should be able to be used by a third party with minimal training/effort. Particularly for scanning, this allows the use of itinerant workers, if desired, to minimise operational costs.

In this patent specification, the term GPS is intended as a reference to all types of global navigation satellite systems (GNSS) including for example Beidou, GPS, Glonass, Gallileo etc.

Any reference to prior art contained herein is not to be taken as an admission that the information is common general knowledge, unless otherwise indicated.

Finally, it is to be appreciated that various alterations or additions may be made to the parts previously described without departing from the spirit or ambit of the present invention.

The invention claimed is:

1. A scanning device for use in gathering data relating to crops including:
   at least one camera; and
   a stroboscopic light source is associated with each at least one camera;
   the device is arranged to be moved around an area where a crop is grown and includes a means for determining the location of the device in the area;
   the device being arranged to take images of the crop from the at least one camera in synchrony with the stroboscopic light source as the device moves around the area at a speed greater than 20 km/h; and
   wherein the stroboscopic light source has a light output of greater than $1.2 \times 10^{-4}$ joules/cm$^2$ (at 2 feet).

2. A scanning device according to claim 1 wherein the stroboscopic light source has a light output of about $1.2 \times 10^{-4}$ joules/cm$^2$ (at 2 feet).

3. A scanning device according to claim 1 wherein the at least one camera is configured with an exposure time of less than 150 μsec.

4. A scanning device according to claim 1 wherein the at least one camera is configured with an exposure time of less than 100 μsec.

5. A scanning device according to claim 1 wherein the at least one camera is configured with an exposure time of about 30 μsec.

6. A scanning device according to claim 1 wherein the at least one camera has a field of view greater than 90 degrees.

7. A scanning device according to claim 1 wherein the at least one camera has a field of view of about 130 degrees.

8. A scanning device according to claim 1 wherein the locating means includes a GPS receiver.

9. A scanning device according to claim 1 which further includes at least one LiDAR detector for gathering data relating to the crop.

10. A scanning device according to claim 9 wherein the LiDAR detector also forms part of the locating means.

11. A scanning device according to claim 1 which is mounted to a wheeled vehicle.

12. A method of gathering data relating to a crop including the steps of:
   associating at least one camera with a stroboscopic light source having a light output of greater than $1.2 \times 10^{-4}$ joules/cm$^2$ (at 2 feet);
   moving the at least one camera and the stroboscopic light source at a speed greater than 20 km/h in relation to an area where a crop is grown;
   determining a location of the at least one camera and the stroboscopic light source; and
   taking an image of the crop from the at least one camera in synchrony with the stroboscopic light source as the at least one camera is moving.

13. A method according to claim 12 wherein the scanning device is moved in relation to the crop at a speed greater than 40 km/h.

* * * * *